United States Patent [19]

Brock et al.

[11] 3,961,372

[45] June 1, 1976

[54] MAGNETIC TAPE TRANSPORT WITH SLOTTED ROTATING HEAD

[75] Inventors: George W. Brock; Frederick W. Hahn, Jr., both of Boulder, Colo.

[73] Assignee: International Business Machines Corporation, Armonk, N.Y.

[22] Filed: July 5, 1974

[21] Appl. No.: 486,028

[52] U.S. Cl. ............................................... 360/102
[51] Int. Cl.² ........................................... G11B 5/60
[58] Field of Search ..................... 360/101, 102, 103

[56] References Cited
UNITED STATES PATENTS

| | | | |
|---|---|---|---|
| 3,823,416 | 7/1974 | Warner | 360/103 |
| 3,840,894 | 10/1974 | Arseneault | 360/102 |
| 3,872,507 | 3/1975 | Sano et al. | 360/102 |

*Primary Examiner*—Robert S. Tupper
*Attorney, Agent, or Firm*—Joscelyn G. Cockburn; Francis A. Sirr

[57] ABSTRACT

A rotating head magnetic tape transport wherein a helical wrap of flexible magnetic tape is formed about a stationary tubular mandrel and a rotatable headwheel which carries a slotted head of generally spherical flying contour.

This rotating head includes a generally spherical surface profile to insure that the head flies with close microinch adjacency to a length of magnetic recording tape. The head's spherical profile includes two parallel airflow slots which extend in the direction of head movement. A uniform, stable, hydrodynamic air film is developed over a relatively large area, generally centered on the head's transducing gap.

7 Claims, 6 Drawing Figures

MAGNETIC TAPE TRANSPORT WITH SLOTTED ROTATING HEAD

BACKGROUND AND SUMMARY OF THE INVENTION

This invention relates to the field of dynamic magnetic information storage and/or retrieval, and particularly to a magnetic tape transport with a rotating head which moves during transducing operation. This movement maintains a flying relationship between the head's transducing gap and the tape's adjacent magnetic recording surface. The head's flying ability is established by a gas bearing, specifically of the hydrodynamic or self-generated type.

Flying heads are well known in the art of scanning rigid magnetic medium such as a rigid magnetic disc. Such an environment is comparable to flying an aircraft a few feet above ground over a hard surface. Consequently, many of the magnetic disc heads use air foil configurations with force biasing to control the head-to-disc flying separation or height. The biasing typically comprises spring or pneumatic loading.

In the art of the flexible magnetic medium, flying heads are also well known. For example, in the magnetic tape art a relatively large, stationary magnetic head transduces the tape in the direction of tape motion. The head is large relative to the tape's lateral dimension or width. Because of this size relationship, the whole width of the tape flies relative to the head, as it passes over the head. Flying has been accomplished in this art by using cylindrically shaped heads, above-atmospheric pressure, and vacuum or below-atmospheric pressure to control the flying height of the entire tape width as it moves across the large stationary head. U.S. Pat. 3,327,916 is an example of such prior art relating to flying heads which are large relative to the flexible magnetic medium.

Another type of flexible magnetic medium is a flexible magnetic recording disc. Two examples of prior art flexible disc devices which include flying heads are one in which the disc is rotated over a rigid backer plate, on a thin film of air which enters the backing plate. A stationary head is then mounted on the backing plate, to protrude into the plane of the disc, and to fly relative thereto. The second example is an apparatus wherein an annular groove is formed in the disc's backing plate. A spherically shaped stationary head extends into the groove. The disc rotation creates hydrodynamic forces causing the head to fly relative to the disc.

The present invention is restricted to that class of flying heads wherein the head is much smaller than the areal dimension of the cooperating flexible magnetic media, be it magnetic tape or a flexible magnetic disc, and to the combination of a spherical surface formed on the head's transducing interface, this surface including at least two parallel surface slots formed in the spherical surface, one on each side of the head's transducing gap, the slots extending in the direction of the relative head/media movement.

In its more specific aspects, the present invention contemplates a rotating head device wherein two spaced and stationary mandrels of the same diameter or cross-section cooperate with an intermediate headwheel.

An alternate construction would be to provide one stationary mandrel and a cooperating rotating mandrel, this rotating mandrel carrying a head thereon, closely adjacent the interface with the stationary mandrel. In this construction the tape is supported adjacent the rotating mandrel by a hydrodynamic and/or hydrostatic air-bearing force.

The flying height of the head defined by the present invention is a function of the slot width and the distance between the slots, the distance parameter being of primary importance. In addition, these slots function to receive tape generated debris and to allow this debris to be flushed away from the head-to-tape interface by the airflow induced by head movement.

While the flying of small dimension heads is known in the prior art, these prior art teachings do not solve the problem of reliably maintaining a uniform, stable, hydrodynamic air film over a relatively large area of the head's surface profile, which area includes the head's transducing gap. The present invention combines a specific surface profile, i.e. generally spherical, with airflow slots running parallel to the direction of head motion. These slots are positioned at least one on each side of the head's gap, to thus center the relatively large area of microinch flying over the gap.

In an embodiment of the present invention, the head is of the well known glass/ferrite type. An additional advantage is achieved with this head by forming at least a portion of the above-mentioned slots so as to relieve or recess the head's glass lines below the spherical profile, thus eliminating a troublesome area of wear and/or contamination. The removal of the glass lines from the head surface profile is an additional advantage in that it operates to reduce residual stress on the head's ferrite gap and thus increases the magnetic permeability of the ferrite. A further advantage of this construction is the enabling of direct measurement of the gap's throat height.

The foregoing and other features, and advantages of the invention will be apparent from the following more particular description of preferred embodiments of the invention, as illustrated in the accompanying drawing.

RELATED INVENTIONS

Figure 1:
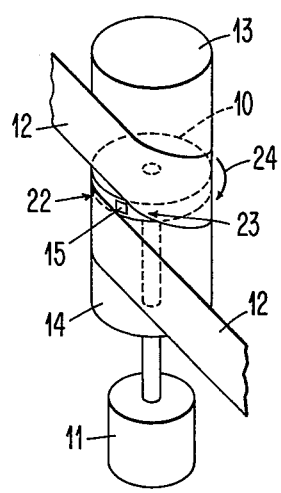
FIG. 1 is a view of a helical tape wrap mandrel and headwheel embodying the present invention.

U.S. patent application Ser. No. 375,966, now abandoned, filed July 2, 1973, by P. J. Arseneault et al, entitled "Improved Tape Transport for Magnetic Recording with a Rotating Head", and commonly assigned, is directed to a preferred arrangement for guiding and air-bearing supporting a length of tape as it extends between a supply spool and a take-up spool, and helically wraps a rotating head mandrel located therebetween.

U.S. patent application Ser. No. 347,089, now U.S. Pat. No. 3,840,894, filed Apr. 2, 1973, by P. J. Arseneault, entitled "Method and Apparatus for Supporting Tape Along a Path of a Rotating Head", and commonly assigned, is directed to a rotating head magnetic tape transport wherein the rotor or headwheel is enlarged in width so that the rotor width is much greater than the tape's data track width or the cooperating head gap. The rotor is mounted in the middle of an air-bearing mandrel about which the tape is helically wrapped. The wide rotor also provides an air bearing for the tape. The wide air-bearing rotor provides a stable air platform upon which the tape rests while it is being scanned by the rotating head.

U.S. patent application Ser. No. 458,964, filed Apr. 8, 1974, by G. N. Nelson et al, entitled "Rotary Head Assembly Forming Air Bearing with Tape", and commonly assigned, is directed to a rotating head magnetic tape transport wherein the rotor carries a flying head of a preferred twocontour cofiguration.

DESCRIPTION OF THE PREFERRED EMBODIMENT

As used herein, the term "flying" or "flying head" is intended to encompass a structure wherein the nominal head-to-tape spacing is in the range of a few microinches, for example, 5 to 20 microinches, and wherein the majority of the force exerted by the head on the tape is a pneumatic force. Occasional contact force, due to the head physically contacting raised portions of the generally rough tape recording surface, is not, however, precluded.

As used herein, the term "air bearing" is intended to encompass the use of a compressible fluid to support the tape, and to the use of hydrodynamic force in such a gas bearing. As used in the art, the term "hydrodynamic" is equivalent to the term "self-generated".

As used herein, the term "head" is intended to encompass a structure having one or more magnetic transducing gaps.

As defined herein, the term "surface of revolution" is intended to restrict a head's flying contour to a three-dimension curved surface. Specifically, this term is intended to include a head having a contour formed as a portion of a sphere, as well as a generally spherical contour, such as a head having a contour whose major portion is spherical and whose leading or forward surface is configured as by a flat taper or a sphere of a different dimension. Such a head is more completely defined in the abovementioned co-pending application by G. N. Nelson, et al. In addition, the head's contour could be formed as a dual radius surface, such as, for example, a section of a football-shaped surface of revolution.

FIG. 1 is a simplified view of a helical tape wrap mandrel/headwheel arrangement embodying the present invention. This simplified view does not show the tape supply spool, the take-up spool, nor the necessary arrangements for guiding the helical tape wrap. Reference may be had to the above-mentioned co-pending application of P. J. Arseneault et al, entitled "Improved Tape Transport for Magnetic Recording with a Rotating Head", for detailed description of preferred arrangements of this type.

In FIG. 1 headwheel 10 is shaft-connected to motor 11 and is driven at a constant speed thereby. Headwheel 10 may be of the same diameter as the adjacent mandrel portions, or may alternatively be of a larger diameter, as defined in the above-mentioned co-pending application of G. W. Baumann et al. By way of another example, and not limitation, headwheel 10 may be as defined in the above-mentioned co-pending application of P. J. Arseneault, entitled "Method and Apparatus for Supporting Tape Along a Path of a Rotating Head". A helical wrap of magnetic recording tape 12 is formed about the generally cylindrical tubular structure formed by stationary mandrel halves 13 and 14. These mandrel halves are closely spaced, in accurate axial alignment, to define an area therebetween which is occupied by headwheel 10. Headwheel 10 carries at least one head 15 which protrudes a short distance above the circumferential headwheel surface. Headwheel 10 rotates at a relatively high speed such as, for example, to achieve a surface speed of 1,000 inches per second relative to the immediately adjacent tape's oxide surface.

Rotating head 15 includes a surface profile to insure that the head flies adjacent a length of magnetic recording tape 12, with close microinch adjacency, and with a uniform, stable, hydrodynamic air film being developed over a relatively large area, which area includes the head's transducing gap. Specifically, this head includes a spherical profile and parallel airflow slots extending in the direction of head movement.

The relatively large spherical contour results in a potentially large in-contact area, should there be a head-tape crash. If such a crash occurs, the contact pressure is distributed over the large area and wear is minimized. In addition the spherical contour retains its basic spherical shape over long periods, thus the head's air-bearing characteristic does not change with use. The head's flying height is controlled by forming the aforementioned slots in the head's spherical contour. Specifically, the head's air-bearing characteristic is a function of the slot width and the distance between the slots.

Figure 2:
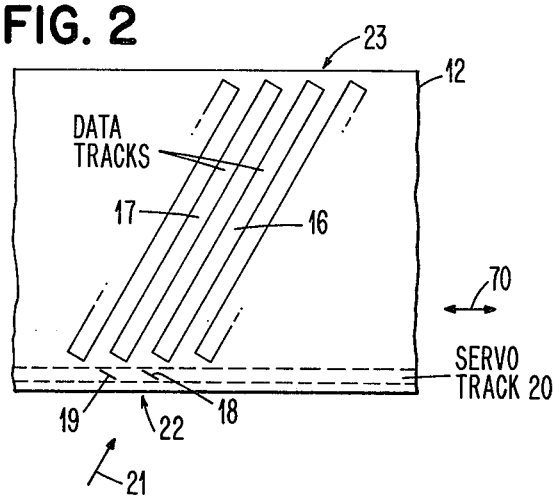
FIG. 2 is a view of the tape format which includes a plurality of individual oblique data tracks and a head servo track.

The tape's magnetic domain format is shown in FIG. 2, and includes a plurality of individual oblique data tracks 16 and 17 whose respective longitudinal positions are identified by distinguishing magnetic recording marks 18 and 19, respectively, these marks comprising servo track 20. The path of head assembly 15 is shown by arrow 21. The tape tension is represented by arrow 70, showing that the head's movement direction is oblique to the tape's tension force.

As the head approaches tape entrance point 22 it must do so without either crashing into the tape's edge or moving away from the tape, out of transducing range. Likewise, the head must leave the tape at exit point 23 without crashing against the tape. In addition, the head assembly must be capable of maintaining its uniform hydrodynamic air film, of only a few microinches, during tape movement transients such as the automatic threading of the tape's end about the mandrel, tape speed changes, and tape tension changes. The ability of the head assembly to maintain its hydrodynamic air film is particularly critical in a FIG. 1 tape transport where the tape moves in small steps, placing one data track at a time in coincident physical relationship with the path of the headwheel.

Heads constructed with a spherical contour in accordance with the present invention have been found to substantially eliminate head crashes and air-bearing thickness variation at entrance and exit points 22 and 23. The head slots reduce the air-bearing height to a few microinches, enhancing the ability of the head of operate in transducing relation to the adjacent magnetic recording surface. These slots, however, are not so wide as to allow the tape to dip down into and contact the edges of the slots. The tape's stiffness parameter establishes a stable recording platform between the slots, coincident with the track of the head gap.

Figure 3:
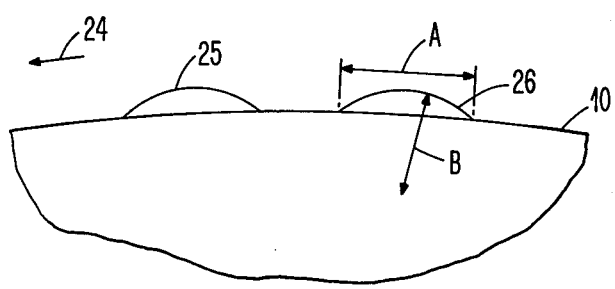
FIG. 3 is a side view of a portion of the headwheel of FIG. 1, showing a write head and a read head mounted thereon.

FIG. 3 shows a portion of headwheel 10 which supports the head assembly, causing the head assembly to move in the direction of arrow 24. The head assembly includes a write head 25 immediately followed by a read head 26. The tape, not shown, closely overlies the headwheel and is spaced therefrom by means of a hydrodynamic and/or hydrostatic air bearing. The two heads protrude beyond the circumference of the headwheel so as to penetrate the plane of the tape and produce localized tent-like tension in the tape adjacent the moving heads.

Figure 4:
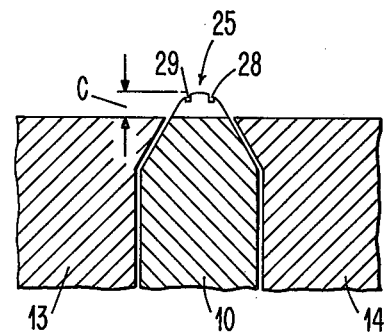
FIG. 4 is a partial section view of the two mandrel halves of FIG. 1, the headwheel and one of the heads of FIG. 3.

FIG. 4 shows a partial section view of the two mandrel halves and the headwheel, specifically showing the penetration C achieved by write head 25.

The top surface of each head is a portion of a sphere. Specifically, a head having a radius B as shown in FIG. 3, and an orthogonal radius smaller than B as shown in FIG. 4. These two orthogonal radii may be identical, for ease of manufacture. FIG. 3 shows that each head includes a pair of surface grooves 28 and 29 which extend in the direction of head movement 24.

Figure 5:
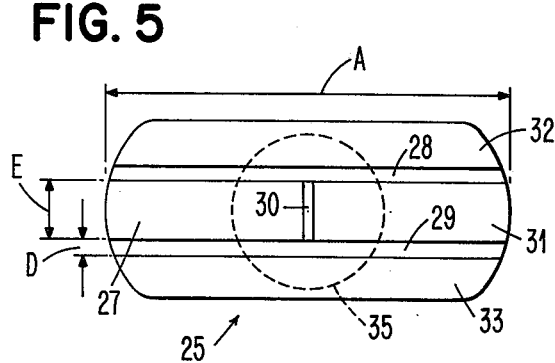
FIG. 5 is a top view of one of the heads of FIG. 3, showing the relatively large area of microinch flying height achieved by the present invention.

FIG. 5 shows the top view of head 25, enlarged to better show slots 28 and 29. Slots having parallel sides are shown. However, slots of other configurations, such as V-shaped slots, are not precluded for the present invention. The slots are formed of a width D and a spacing E, the spacing E being larger for the write head than it is for the read head due to the increased length of the write head's transducing gap 30. The slots are, for example, 0.01 inch deep. The slot width D is selected to be wide enough to insure self cleaning as the head moves, and narrow enough to prevent tape wear caused by the tape collapsing into the slots and thus crashing into the slot edges. In one embodiment of the invention the slots were selected to have a width approximately larger than the largest expected oxide particle which may dislodge from the media. In addition these slots provide controlled airflow relief of the dynamic air wedge which is carried into the tape/head interface by the head's rapid movement of, for example, 1000 inches per second. It is found that precise and predictable tape/head separation control is determined by slot separation E and slot width D parameters.

An additional benefit is achieved by slots 28 and 29 when the heads are of a construction wherein members 27 and 31 are composed of ferrite, members 32 and 33 are barium-titanate-ceramic (BTC), and slots 28 and 29 are formed by recessing the head's glass lines below the head's surface profile. This elimination of glass lines contiguous with the head's surface prevents undesirable wear caused by the buildup of tape debris in the glass line. In addition, the recessed glass lines eliminate stress on the head's core, thereby improving its magnetic performance.

As a result of this slotted spherical head construction, hydrodynamic air bearing 35 of a relatively large areal dimension is established, centered on and surrounding the head's gap, and having a uniform gap-to-tape spacing of a few microinches.

The adjacent head sides 32 and 33 provide air-bearing support and control the tape wrap across head gap 30. Sides 32 and 33 further provide additional air-bearing stiffness during changes in tape tension, giving additional cushioning to the vertical load represented by the tape.

Figure 6:
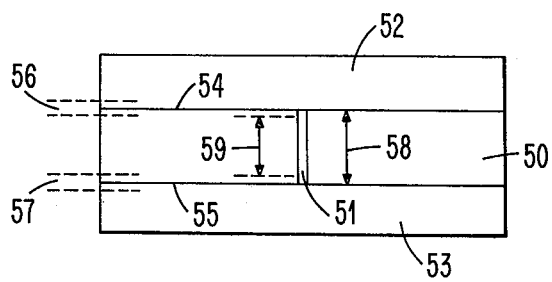
FIG. 6 is a top view of a head made of a ferrite core, BTC side members, and glass bonding.

Referring to FIG. 6, this head is of the Ferrite/BTC type. The head's core 50 is formed of a high permeability magnetic ferrite and includes transducing gap 51. Side members 52 and 53 must be non-magnetic and must have thermal expansion and wear characteristics similar to ferrite core 50. A preferable material is barium-titanate-ceramic (BTC), although non-magnetic ferrite will also suffice. Members 50, 52 and 53 must be held together as a unitary structure, as by mechanically clamping, gluing or bonding with epoxy cement or glass at interface lines 54 and 55. Glass bonding is preferred. When these glass bond lines are contiguous with the head surface, preferential wear of the glass occurs resulting in magnetic tape generated debris tending to adhere to the bond line, thus contaminating the head surface. An additional advantage is achieved in accordance with the present invention by forming the above-described slots in areas 56 and 57, so as to recess bond lines 54 and 55 below the flying contour of the head.

In removing material to form these slots, it may be desirable to remove a portion of core 50, thus reducing the effective length of gap 51 to, for example, length 59. This feature is of particular importance where very narrow data tracks 16 and 17, FIG. 2, are to be written, since manufacturing a head such as shown in FIG. 6 is made easier if the width 58 of core 50 is not too small.

Because tape tension changes are to be expected, it is important that rapid changes in head contour be avoided (such as corners, edges, etc.). This is provided by the spherical contour and by rounding off the edges of the slots, as would appear in an enlarged view of FIG. 4. This requirement of tape tension changes, while the head is moving, puts a restriction on the maximum width of the slots, since slots wider than 0.010 inch show an increasing propensity to scratch tape during tension changes.

The following table shows typical dimensions, in inches, for the legends shown in FIGS. 3, 4 and 5:

| | |
|---|---|
| A | 0.25 |
| B | 0.75 radius |
| C | 0.004 |
| D | 0.006 |
| E | 0.015 write head gap |
| F | 0.008 read head gap |

While the invention has been particularly shown and described with reference to a preferred embodiment thereof, it will be understood by those skilled in the art that various changes in form and details may be made therein without departing from the spirit and scope of the invention.

What is claimed is:

1. A rotating magnetic transducer for magnetically reading and writing information from a flexible information-storage media which flies relative to said rotating magnetic transducer, comprising:
 a flying flexible information-storage media having a magnetizable surface,
 a head having pole pieces with transducing interface rotating relative to said media, said transducing interface having a spherical surface and including a transducing gap with at least two parallel surface slots, being positioned in the pole pieces of said head, and extending in the general direction of said transducer movement, perpendicular to said transducing gap and positioned one on each side of the transducing gap, and support means to rotate said head so that an air bearing is generated thereby enabling the storage media to fly with microinch adjacency to the transducing interface of the head.

2. Apparatus as defined in claim 1 wherein said spherical surface is formed with a radius in the range of from ¾ inch to 1 inch.

3. Apparatus as defined in claim 2 wherein the slots are separated by a distance equal to the length of said transducing gap.

4. A rotating magnetic transducer for magnetically reading and writing information from a flexible information-storage media which flies relative to said rotating magnetic transducer, comprising:

a flying flexible information-storage media having a magnetizable surface, a head with transducing interface rotating relative to said media, said transducing interface having a spherical surface and including a transducing gap with at least two parallel surface slots extended in the general direction of said transducer movement, perpendicular to said transducing gap and positioned one on each side of the transducing gap, wherein the minimum width of said slots being selected to be larger than the largest expected oxide particle which may dislodge from said media, and wherein the maximum width of said slots being selected in accodance with the stiffness characteristic of said media, such that said media does not deform into said slots, support means to rotate said head so that an air bearing is generated thereby enabling the storage media to fly with microinch adjacency to the transducing interface of the head.

5. A rotating magnetic transducer for magnetically reading and writing information from a flexible information-storage media which flies relative to said rotating magnetic transducer, comprising:

a flying flexible information-storage media having a magnetizable surface, a head with a spherical transducing surface rotating relative to and penetrating said media, with microinch adjacency to said magnetizable surface, rotatable means for rotating and positioning said head in transducing relationship with the informationstorage media, an air bearing formed on the interface of said head with said magnetizable surface, said air bearing having an areal dimension which is much smaller than the shortest areal dimension of said storage media.

a pair of ferrite pole pieces defining a transducing gap contiguous with said surface, a pair of glass bonding spacers, one on each side of said gap and extending generally normal thereto, a pair of barium-titanate-ceramic side members positioned one on each side of said glass spacers, said barium-titanate-ceramic side members running the length of the glass bonding spacers being affixed thereto and providing air bearing support to control the flexible information storage media across the transducing gap, and a pair of parallel surface slots being positioned in said pole pieces one on each side of said gap and in alignment with the glass spacers so that said glass spacers are recessed from the surface.

6. Apparatus as defined in claim 5 wherein said spherical surface is formed with a radius in the range of ¾ inch to 1 inch.

7. Apparatus as defined in claim 6 having two slots separated by a distance at least as great as the length of said transducing gap.

* * * * *